(12) United States Patent
Wu et al.

(10) Patent No.: US 11,277,626 B2
(45) Date of Patent: Mar. 15, 2022

(54) REGION OF INTEREST QUALITY CONTROLLABLE VIDEO CODING TECHNIQUES

(71) Applicant: Alibaba Group Holding Limited, Grand Cayman (KY)

(72) Inventors: Guanlin Wu, Hangzhou (CN); Minghai Qin, Hangzhou (CN); Tae Meon Bae, Hangzhou (CN); Sicheng Li, Hangzhou (CN); Yuanwei Fang, Hangzhou (CN); Yen-Kuang Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/798,146

(22) Filed: Feb. 21, 2020

(65) Prior Publication Data

US 2021/0266570 A1 Aug. 26, 2021

(51) Int. Cl.
*H04N 19/167* (2014.01)
*H04N 19/124* (2014.01)
*H04N 19/147* (2014.01)

(52) U.S. Cl.
CPC ......... *H04N 19/167* (2014.11); *H04N 19/124* (2014.11); *H04N 19/147* (2014.11)

(58) Field of Classification Search
None
See application file for complete search history.

(56) References Cited

U.S. PATENT DOCUMENTS

| | | | |
|---|---|---|---|
| 2011/0235706 A1* | 9/2011 | Demircin | H04N 19/126 375/240.03 |
| 2015/0016510 A1* | 1/2015 | Carlsson | H04N 19/167 375/240.03 |
| 2015/0181168 A1* | 6/2015 | Pahalawatta | G06K 9/00624 348/14.12 |
| 2018/0376153 A1* | 12/2018 | Gokhale | H04N 19/137 |
| 2020/0151487 A1* | 5/2020 | Yonezawa | H04N 19/176 |
| 2021/0081676 A1 | 3/2021 | Kim et al. | |
| 2021/0082122 A1 | 3/2021 | Takeda et al. | |
| 2021/0082181 A1 | 3/2021 | Shi et al. | |
| 2021/0084222 A1 | 3/2021 | Kim | |
| 2021/0089040 A1 | 3/2021 | Ebrahimi Afrouzi | |
| 2021/0089752 A1 | 3/2021 | Wang et al. | |
| 2021/0090250 A1 | 3/2021 | Soans et al. | |
| 2021/0090608 A1 | 3/2021 | Zhang et al. | |
| 2021/0097290 A1 | 4/2021 | Yang et al. | |
| 2021/0097667 A1 | 4/2021 | Barua et al. | |
| 2021/0099687 A1 | 4/2021 | Shin et al. | |

\* cited by examiner

*Primary Examiner* — Edemio Navas, Jr.

(57) ABSTRACT

Video coding techniques including differential bit rate or quality coding of one or more regions of interest and one or more non-regions of interest based on information including one or more of coordinates of the one or more regions of interest, a target complexity, residual encoder bit data, a requested quality, a difference between the current video data frame and a reconstructed video data frame, a target quality, a requested bit rate, frame target bit allocation and an as encoded bit rate.

18 Claims, 8 Drawing Sheets

REGION OF INTEREST QUALITY CONTROLLABLE VIDEO CODING TECHNIQUES

BACKGROUND OF THE INVENTION

Numerous techniques are used for reducing the amount of data consumed by the transmission or storage of video. One common technique is to use variable bit rate encoding of video frame data. For example, a first bitrate can be utilized to encode one or more regions of interest (ROI), and a second bitrate can be utilized to encode one or more non-region of interest. Referring to FIG. 1A, an exemplary video frame image is illustrated. The portion of the frame that contains a piece of jewelry may be more important than the rest of the frame that generally contains the background. A region of interest (ROI) 110 about the piece of jewelry may be specified by a bounding box 120, with the remainder of the video from being non-region of interest 130. The detected region of interest (ROI) 110 can be encoded with a higher bit rate, so that the image of the piece of jewelry will have a better image quality than the non-region of interest 130 portion of the image that is encoded with a lower bit rate.

The detection of regions of interest and variable bit rate encoding of regions of interest and non-regions of interest can be computationally intensive. In addition, it can be difficult to adjust the variable bit rate encoding. Accordingly, there is a continuing need for improved variable bit rate encoding of video images.

SUMMARY OF THE INVENTION

The present technology may best be understood by referring to the following description and accompanying drawings that are used to illustrate embodiments of the present technology directed toward controllable video coding systems and methods.

In one embodiment, a video processing unit can include a region of interest detector, a video encoder and a rate controller. The region of interest detector can be configured to receive an input video stream and determine one or more regions of interest of an image data frames of the input video stream. The video encoder can be configured to differentially encode the determined one or more regions of interest using a first bit rate and one or more non-regions of interest using a second bit rate to generate a compressed bit stream of the image data frames. The rate controller can be configured to control one or more parameters of the region of interest detection and control one or more parameters of bit rate encoding based on one or more of a requested quality, an estimated as encoded quality and an estimated complexity.

In another embodiment, a video processing unit can include a region of interest detector, a rate controller and a video encoder communicatively coupled together. The region of interest detector can be configured to determine one or more regions of interest in an image data frame. The rate controller can include a region of interest/non-region of interest bit allocation unit, a region of interest quantization model unit, and a non-region of interest quantization model unit, among others. The region of interest/non-region of interest bit allocation unit can be configured to generate a region of interest target bit allocation and a non-region of interest target bit allocation based on a frame level bit allocation, coordinates of the one or more determined regions of interest, a complexity estimation of the one or more regions of interest and the one or more non-regions of interest, and a quality estimation of the one or more regions of interest and non-region of interest. The region of interest quantization model unit can be configured to generate a region of interest quantization parameter based on the region of interest target bit allocation. The non-region of interest quantization model unit can be configured to generate a non-region of interest quantization parameter based on the non-region of interest target bit allocation. The video encoder can be configured to generate a compressed bit stream of the image data frame based on the region of interest quantization parameter and the non-region of interest quantization parameter.

In yet another embodiment, a video processing method can include determining one or more regions of interest for a current video data frame. One or more quantization parameters or one or more rate-of-distortion parameters can be determined for the one or more determined regions of interest and one or more non-regions of interest of the current video data frame. The current video data frame can be encoded in a compressed bit stream based on the one or more determined regions of interest and the one or more determined quantization parameters or rate-of-distortion parameters and a requested quality.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1A:
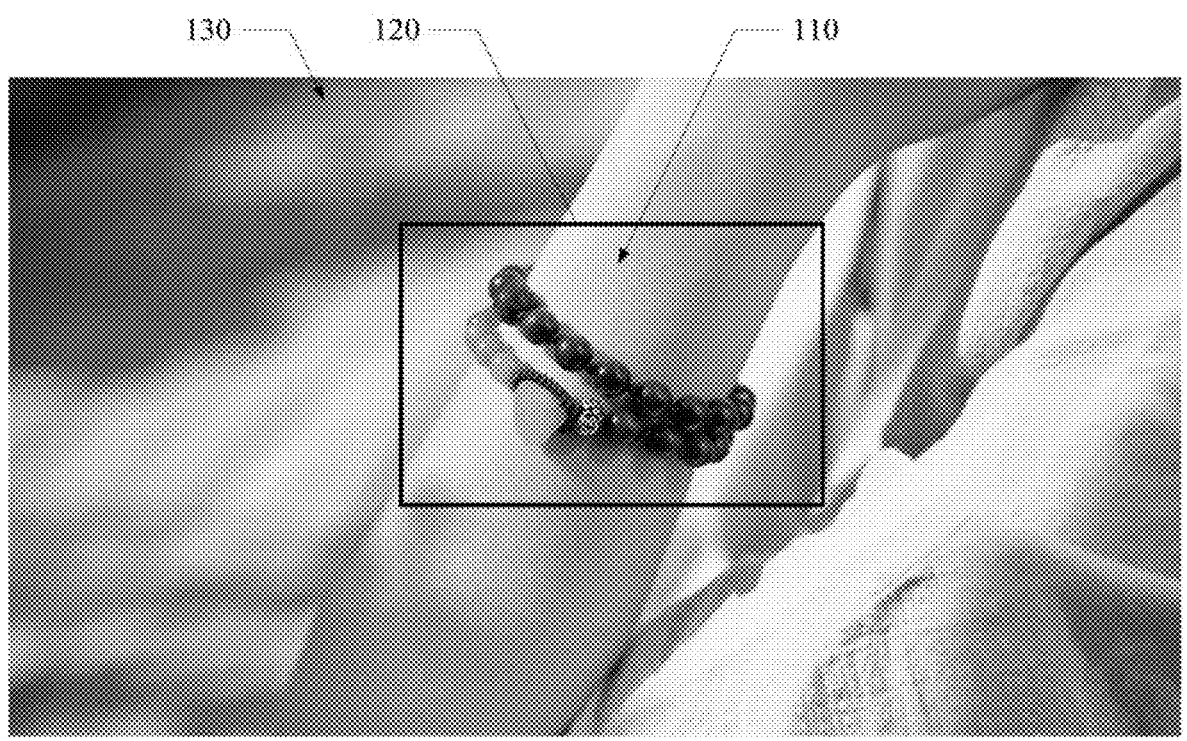
FIGS. 1A and 1B illustrate an exemplary video frame image.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the present technology is intended to cover alternatives, modifications and equivalents, which may be included within the scope of the invention as defined by the appended claims. Furthermore, its the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated, in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms, such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects, The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
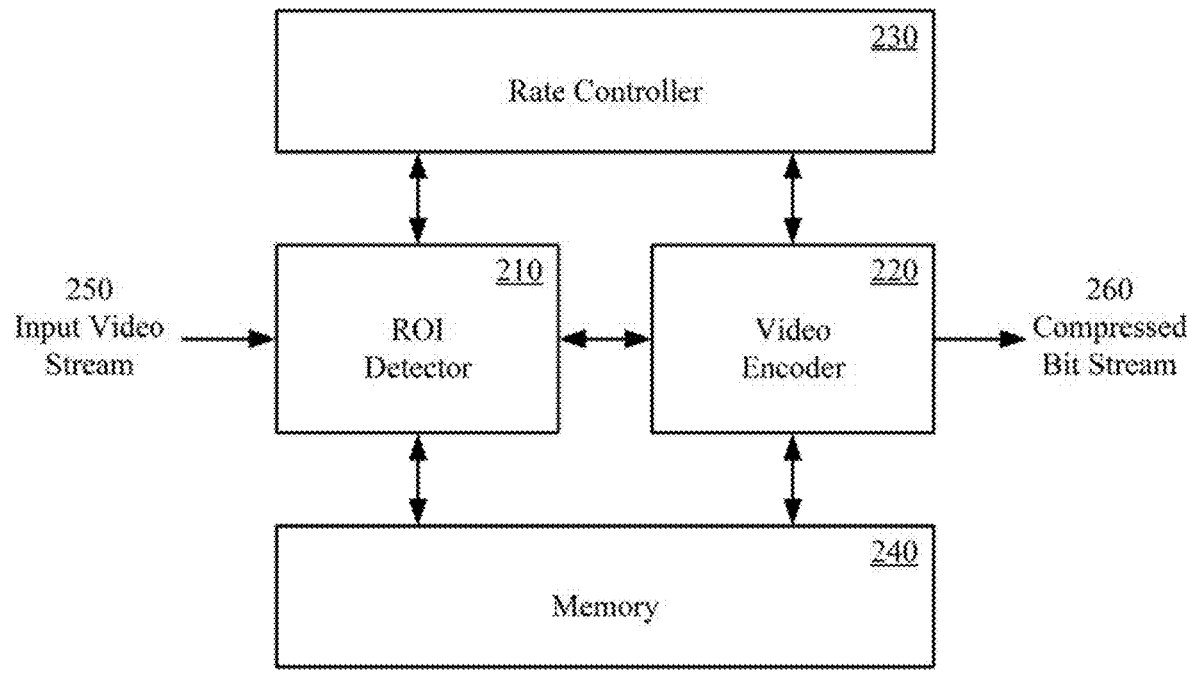
FIG. 2 shows a block diagram of a video processing unit, in accordance with aspects of the present technology.
Figure 3:
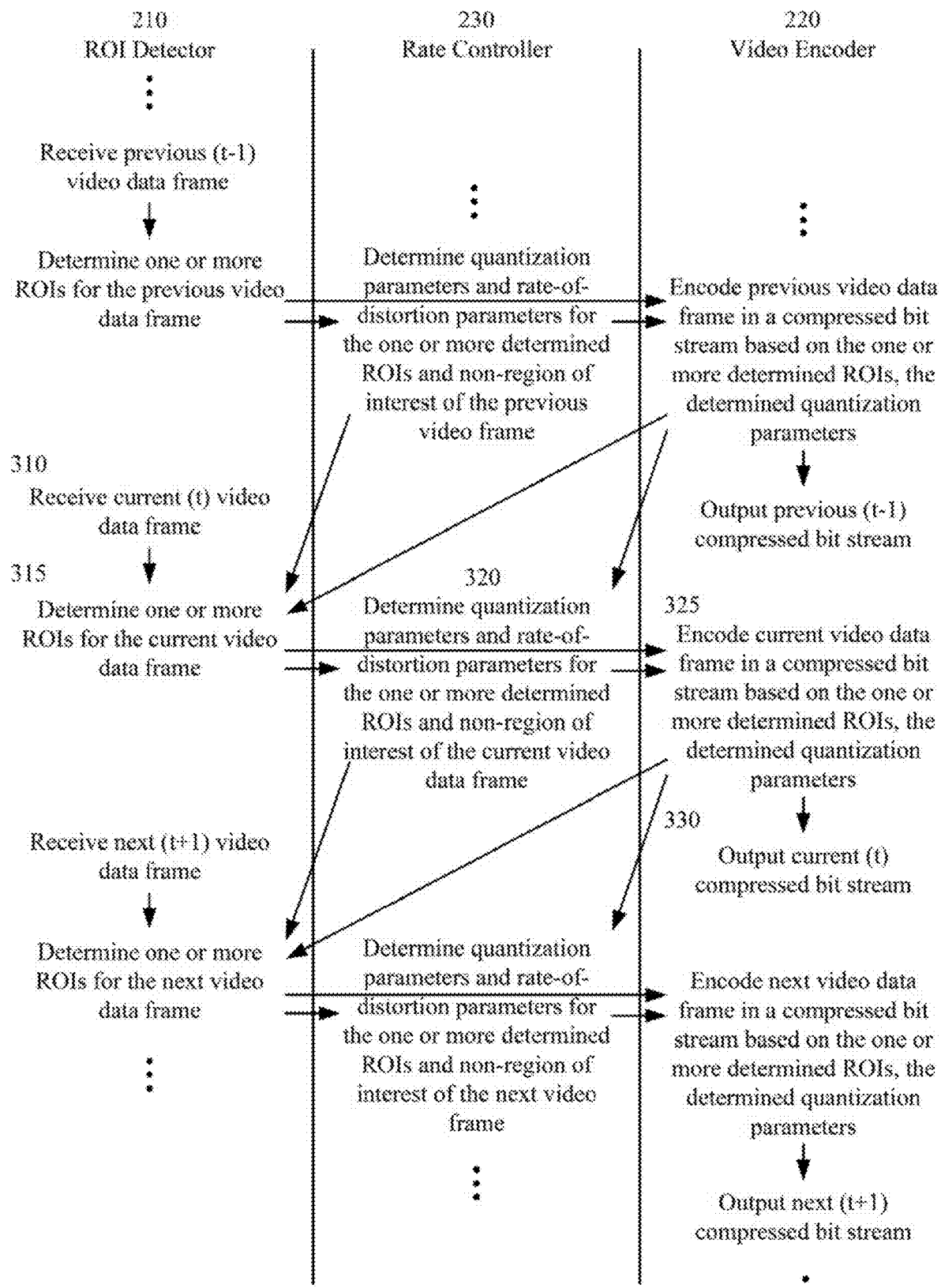
FIG. 3 shows a flow diagram of video processing, in accordance with aspects of the present technology.

Referring to FIG. 2 a video processing unit, in accordance with aspects of the present technology, is shown. The video processing unit 200 can include a region of interest (ROI) detector 210, a video encoder 220, a rate controller 230 and memory 240. The region of interest detector 210 can be configured to determine one or more regions of interest 110 and one or more non-regions of interest 130 in frames of an input video stream 250. The term region of interest as used herein generally refers to identification of objects within a data set that also includes identification of an associated object type. Regions of the image that no object of one or more object types are detected in are generally referred to a non-regions of interest. The video encoder 220 can be configured to encode the one or more regions of interest using a first bit rate and the one or more non-regions of interest using a second bit rate to generate a compressed bit stream 260. The rate controller 230 can be configured to control parameters of region of interest detection by the region of interest detector 210 and variable bit rate encoding by the video encoder 220. The memory 240 can be configured to store, cache, or buffer the frame data, region of interest data, non-region of interest data, encoding data, rate control data, intermediate result data, and the like. The video processing unit 200 can be implemented in hardware, firmware, software or combinations thereof. Operation of the video processing unit will be further explained with reference to FIG. 3, which shows a video processing method, in accordance with aspects of the present technology.

The region of interest detector 210 can receive the input video stream 250, at 310. The input video stream 250, received by the region of interest detector 210, can include a plurality of image data frames. The region of interest detector 210 can be configured to determine one or more regions of interest 110 in one or more image data frames of the input video stream 250, at 315. The one or more regions of interest can be determined by the region of interest detector 210 based on various information, including information received from the rate controller 230 and the video encoder 220, as describe below in more detail. The portions of the image data frame not in the one or more determined regions of interest 110 can be considered one or more non-regions of interest 130. The region of interest detector 210 can also be configured to determine region of interest priorities of the one or more determined regions of interest based on various information, including information received from the rate controller 230 and the video encoder 220.

The rate controller 230 can receive the current video data frame and the one or more determined regions of interest from the region of interest detector 210. The rate controller 230 can be configured to determine quantization parameters or rate-distortion-optimization (RDO) parameters for the one or more determined regions of interest and the one or more non-regions of interest, at 320. The quantization parameters or rate-distortion-optimization (RDO) parameters for the one or more determined regions of interest and for the one or more non-regions of interest can be determined by the rate controller 230 based on various information, including information received from the region of interest detector 210 and the video encoder 220. In one implementation, the information can include a requested bit rate and or a requested quality received by the rate controller 230. The information can also include a reconstructed video and or residual encoder bit data received from the video encoder 220. The information can also include region of interest coordinates received from the region of interest detector 210. The information can also include estimated target complexity and or estimated target complexity generated by the rate controller 230. The rate controller 230 can use the information to determine respective quantization parameters (QP) and or rate-distortion-optimization (RDO) parameters for the one or more regions of interest and the one or more non-regions of interest. Optionally, the rate controller can determine respective quantization parameters and or rate-of-distortion parameters for the one or more regions of interest and the one or more non-regions of interest having a constrained rate of change. Constraining the rate of change of the quantization parameters and or rate-of-distortion parameters can improve the performance of encoding by the video encoder 220.

The video encoder 220 can receive the current video data frame, the one or more determined regions of interest from the region of interest detector 210, and the determined quantization parameters and rate-of distortion parameters, constrained or unconstrained, from the rate controller 230. The video encoder 220 can be configured to generate a compressed bit stream of the current video data frame based on the constrained or unconstrained quantization parameters and or rate-of-distortion parameters, at 325.

The compressed bit stream can be generated by the video encoder 220 based on various information, including information received from the region of interest detector 210 and the rate controller 230. The rate controller 230 can provide information to the video encoder 220 to encode the video with a specified quality for the one or more regions of interest and the one or more non-regions of interest respectively. In one implementation, the quality of the region of interest can be enhanced if allocating more bits to the one or more regions of interest when there is a predefined total bit budget for the compressed bit stream of the current image data frame. In another implementation, bits can be saved from non-regions of interest quality degradation when keeping the same quality for the one or more determined regions of interest. In another implementation, quality of the one or more regions of interest or of the one or more non-regions of interest can be controlled when allocating precise bits for the one or more regions of interest and for the one or more non-regions of interest. At 330, the compressed bit stream can be output by the video encoder 220. In one implementation, the compressed bit stream can be transmitted across one or more bandwidth limited communication links. In another implementation, the compressed bit stream can be stored on one or more computing device readable storage media.

The video encoder 220 can also be configured to feedback encoding information to the rate controller 230 and the region of interest detector 210. The rate controller 230 can also be configured to feedback rate information to the region of interest detector 210. In one implementation, the video encoder 220 can feedback remaining bit budget information as an encoded bit rate of the one or more determined regions of interest and the one or more non-regions of interest, a quality of the one or more determined regions of interest and the one or more non-regions of interest, and or the like. The information feedback from the video encoder 220 to the rate controller 230 can be used by the rate controller 230 to adjust the determination of the quantization parameters and or rate-of-distortion parameters for the one or more determined regions of interest and one or more non-regions of interest for the next video frame, and or other information generated by the rate controller 230. The information feedback from the video encoder 220 to the region of interest detector 210 can be used by the region of interest detector 210 to adjust the one or more determined regions of interest, region of interest coordinates, region of interest priorities and or other information generated by the region of interest detector 210. In one implementation, the information feedback from the video encoder 220 to the region of interest detector 210 can indicate that the remaining bit budget is too low, the quality of the one or more regions of interest is too high, the quality of the non-region of interest is too low, and or the like. The indication that the remaining bit budget is too low, the quality of the one or more regions of interest, the quality of the one or more non-region of interests is too low, and or the like can be used by the region of interest detector 210 to reduce the size of the one or more determined regions of interest in the video data frame to save more bits in encoding the video data frame as a compressed data stream.

Figure 4:
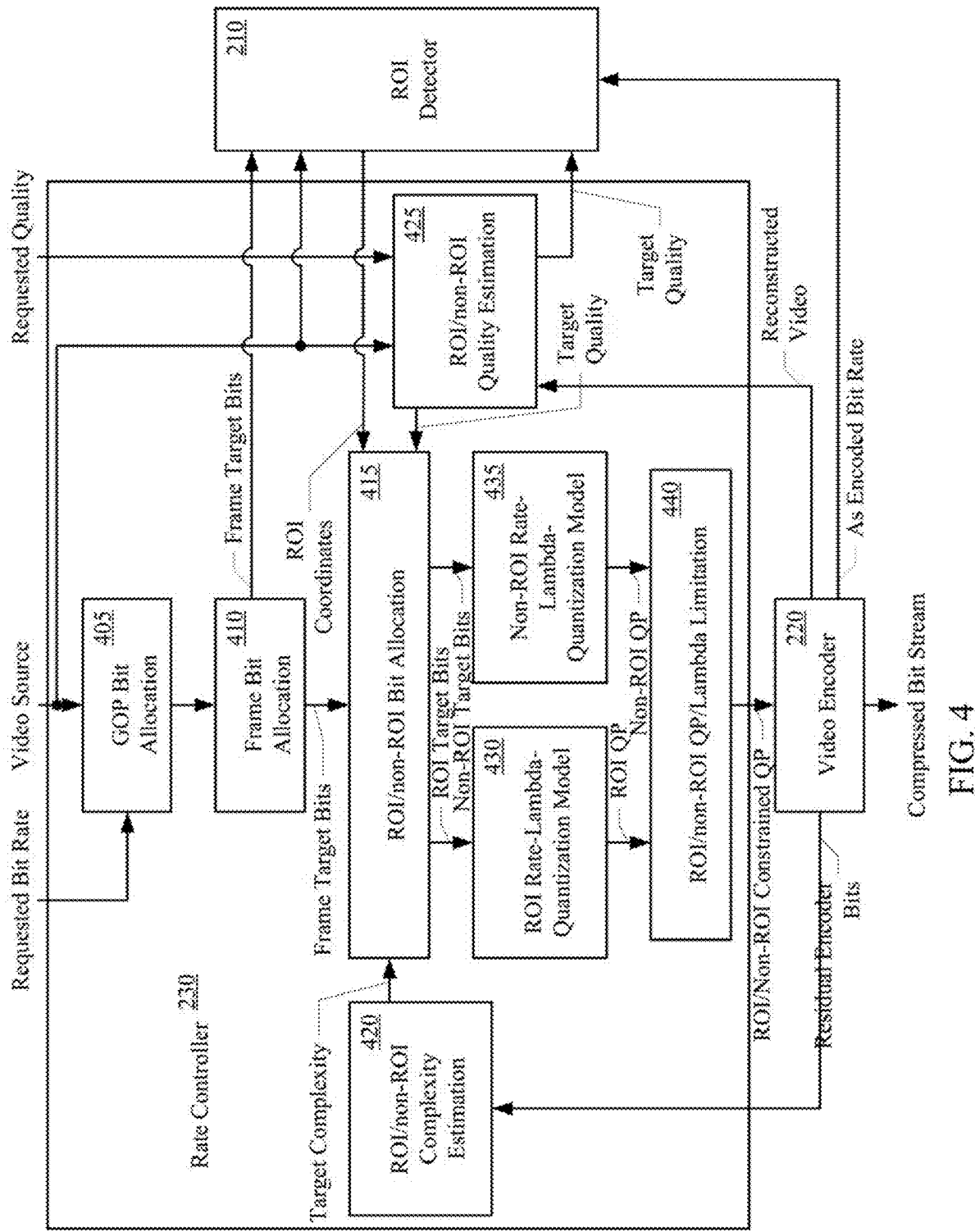
FIG. 4 shows a block diagram of a video rate controller, in accordance with aspects of the present technology.

Referring now to FIG. 4, a video rate controller, in accordance with aspects of the present technology, is shown. The rate controller 230 can be communicatively coupled to the region of interest detector 210 and the video encoder 220. The rate controller 230 can include a group of pictures (GOP) bit, allocation unit 405 configured to receive a requested bit rate and a video source. The video source can include a plurality of video data frames. The group of pictures bit allocation unit 405 can be configured to perform group of pictures (GOP) level bit allocation based on the video data frames and the requested bitrate. A frame bit allocation unit 410, of the rate controller 230, can be configured to perform frame level bit allocation based on the group of picture bit allocation to generate a frame target bit allocation.

A region of interest/non-region of interest bit allocation unit 415 of the rate controller 230 can be configured to receive coordinates of one or more regions of interest determined by the region of interest detector 210 and the frame target bit allocation. The region of interest/non-region of interest bit allocation unit 415 can also be configured to receive target complexity estimates of the one or more regions of interest and non-region of interest estimated by a region of interest/non-region of interest complexity estimation unit 420, as described further below. The region of interest/non-region of interest bit allocation unit 415 can also be configured to receive quality estimations of the one or more regions of interest and one or more non-regions of interest estimated by a region of interest/non-region of interest quality estimation unit 425, as described further below. The region of interest/non-region of interest bit allocation unit 415 can be configured to allocate bits for the one or more determined regions of interest and the one or more non-regions of interest respectively based on the frame target bit allocation, the coordinates of the ono or more determined regions of interest, the estimated target complexity of the one or more regions of interest and non-region of interest, and the estimated target quality of the one or more regions of interest and non-region of interest.

A region of interest rate-lambda-quantization model unit 430, of the rate controller 230, can receive the region of interest target bit allocation from the region of interest/non-region of interest bit allocation unit 415. The region of interest rate-lambda-quantization module unit 430 can be configured to generate quantization parameters (QP) and or rate-distortion-optimization (RDO) parameters for the one or more determined regions of interest based on the region of interest target bit allocation.

A non-region of interest rate-lambda-quantization model unit 435, of the rate controller 230, can receive the non-region of interest target bit allocation from the region of interest/non-region of interest bit allocation unit 415. The non-region of interest rate-lambda-quantization module unit 435 can be configured to generate quantization parameters (QP) and or rate-distortion-optimization (RDO) parameters for the one or more non-regions of interest based on the non-region of interest target bit allocation.

A non-region of interest rate-lambda limitation unit 440 can receive the quantization parameters (QP) and or rate-distortion-optimization (RDO) parameters for the one or more determined regions of interest and the one or more non-regions of interest. The non-region of interest rate-lambda limitation unit 440 can be configured to constrain changes in the quantization parameters (QP) and or rate-distortion-optimization (RDO) parameters for the one or more determined regions of interest and the one or more non regions of interest to a predetermined rate of change range for quality stability purposes.

The video encoder 220 can receive the constrained quantization parameters (QP) and rate-distortion-optimization (RDO) parameters. The video encoder 220 can be configured to generate compressed bit stream for the received video frame data based on the constrained quantization parameters (QP) and or rate-distortion-optimization (RDO) parameters. Optionally, the video encoder 220 can be configured to generate the compressed bit stream based on the unconstrainted quantization parameters (QP) and or rate-distortion-optimization (RDO) parameters. The video encoder 220 can also be configured to generate feedback to the region of interest/non-region of interest complexity estimation unit 420, the region of interest/non-region of interest quality estimation unit 425, and the region of interest detector 210 after encoding a current frame. In one implementation, the video encoder 220 can provide residual encoder bit information to the region of interest/non-region of interest complexity estimation unit 420. The video encoder 220 can also provide reconstructed video frame data to the region of interest/non-region of interest quality estimation unit 425. The video encoder 220 can also provide as encoded bit rate information to the region of interest detector 210.

The region of interest/non-region of interest complexity estimation unit 420 can receive residual encoder bit information from the video encoder 220. The region of interest/non-region of interest complexity estimation unit 420 can be configured to estimate the target complexity of regions of interest and non-regions of interest based on the residual encoder bits of the previous frames or the current frame. In one implementation, the residual encoder bits can be a mean absolute difference (MAD), a mean square absolute error (MSE), or the like.

In one implementation, the lower bound of bits for the one or more determined regions of interest and the non-region of interest can be calculated by the region of interest/non-region of interest bit allocation unit 415 based on the complexity values generated by the region of interest/non-region of interest, complexity estimation unit 420. The frame target bits minus the lower bound of bits for the one or more determined regions of interest and the non-region of interest is the remaining bits, which can be used to perform the quality control of the one or more regions of interest and the non-region of interest to reduce the chance of the one or more determined regions of interest and non-region of interests from consuming too many bits and cause bit-starving during generation of the compressed bit stream for the next image data frame.

The region of interest/non-region of interest quality estimation unit 425 can receive request quality information. The requested quality information can indicate a requested quality for the one or more determined regions of interest and a requested quality for the one or more non-regions of interest. In one implementation, the requested quality information can be a difference factor between the quality for the one or more determined regions of interest and the quality for the one or more non-regions of interest. For example, the requested quality can be expressed as a 0 dB, 1 dB, 2 dB, etc. difference between quality for the one or more determined regions of interest and the quality for the one or more non-regions of interest. The region of interest/non-region of interest quality estimation unit 425 can be configured to estimate a target quality for the one or more determined regions of interests and the one or more non-regions of interests based on the requested quality information. The region of interest/non-region of interest quality estimation unit 425 can also receive the input video source and the reconstructed video from the video encoder 220. The region of interest/non-region of interest quality estimation unit 425 can be further configured to estimate the target quality for the one or more determined regions of interests and the one or more non-regions of interests based on the difference between the input video source and the reconstructed video. The target quality for the one or more determined regions of interests and the one or more non-regions of interests can be output to the region of interest and non-region of interest bit allocation unit 415, and the region of interest detector 210.

In one implementation, the region of interest/non-region of interest quality estimation unit 425 can be configured to use the feedback information from the video encoder 220 to adjust a weighting of a target bit allocation for the one or more determined regions of interest and the non-region of interest. In one implementation, if the quality of the one or more determined regions of interest is too low for the current (t) frame, more bits can be allocated to the one or more determined regions of interest in the next (t+1) frame to upgrade the quality. In one implementation, the quality of a video data frame can be some measure from the original frame and a reconstructed frame, such as the mean absolute value (MAD), peak signal-to-noise ratio (PSNR), structural similarity index matric (SSIM), video multimethod assessment fusion (VMAF), or the like. The quality can also be the difference of MAD, PSNR, SSIM, VMAF, or the like.

Figure 1B:
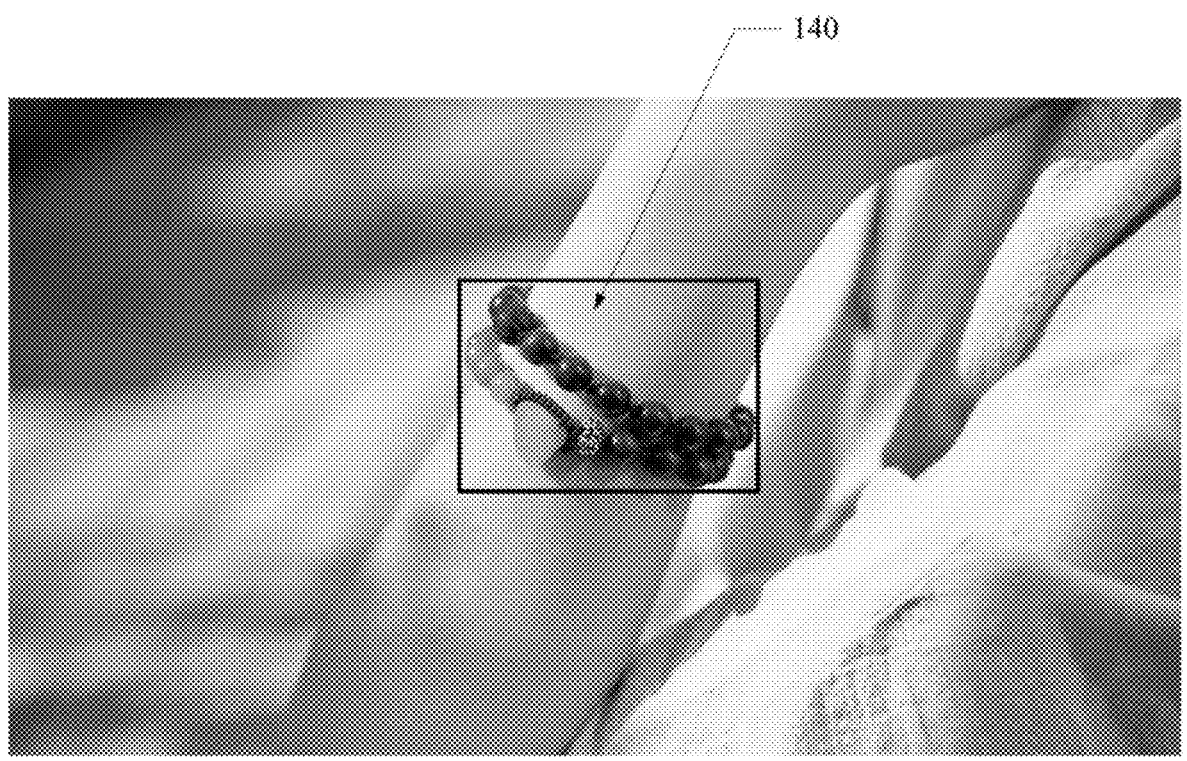

The region of interest detector 210 can receive the frame target bit allocation, the target quality and the as encoded bit rate. The region of interest detector 210 can be configured to adjust the one or more determined regions of interest and the one or more non-regions of interest based on the frame target bit allocation, the target quality and the as encoded bit rate. In one implementation, the size of the one or more determined regions of interest can be decreased or increased based on the frame target bit allocation, the target quality and the as encoded bit rate. For example, the size of the one or more regions of interest 140 if the frame target bit allocation and the as encoded bit rate indicate that the estimated target quality cannot be satisfied, as illustrated in FIG. 1B. In another implementation, the number of determined regions of interest can be deceased or increased based on the frame target bit allocation, the target quality and the as encoded bit rate.

Figure 5A:
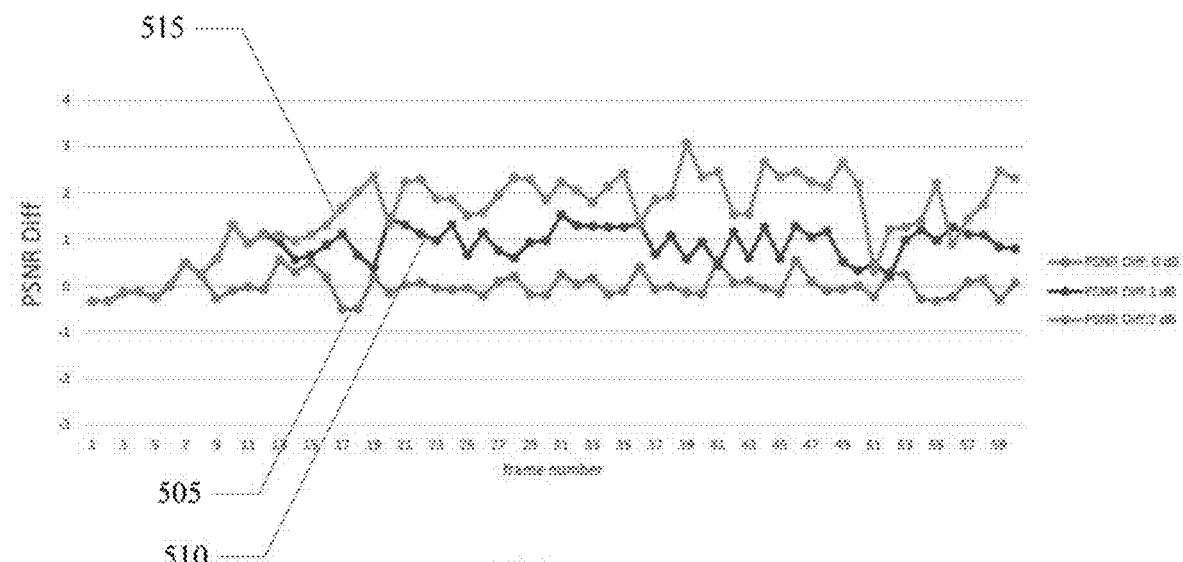
FIGS. 5A-5D illustrate exemplary peak-signal-to-noise ratios (PSNR) for encoded frames, in accordance with aspects of the present technology.
Figure 5B:
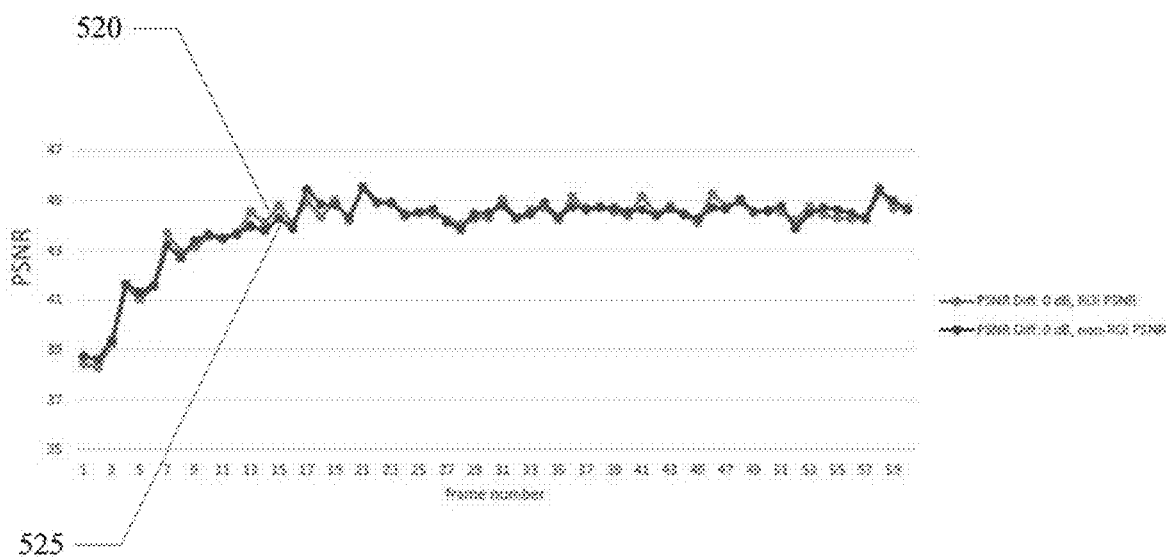
Figure 5C:
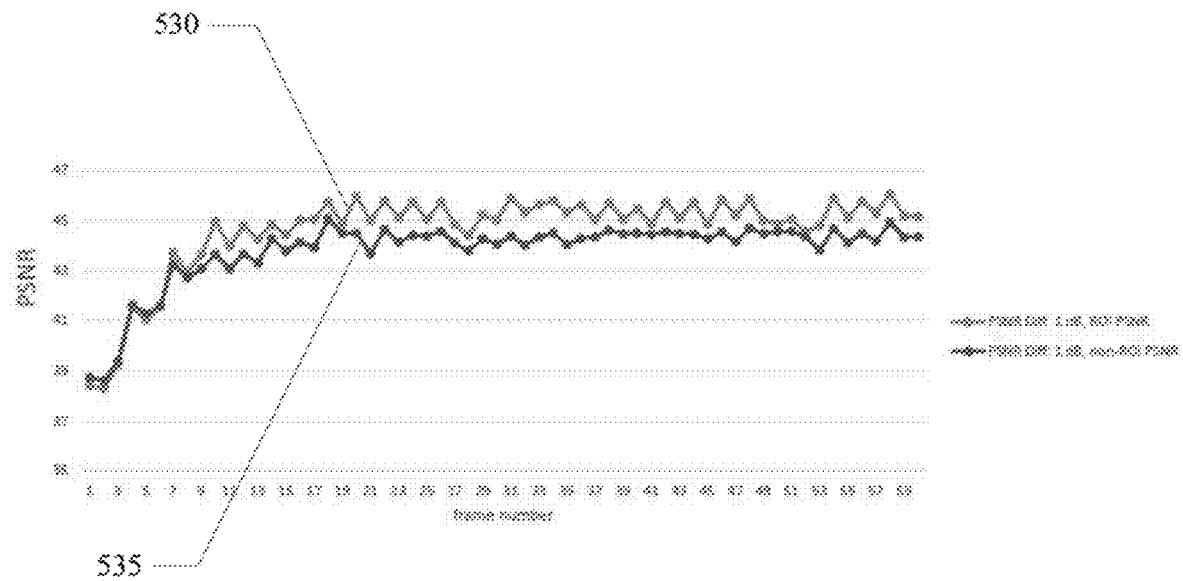
Figure 5D:
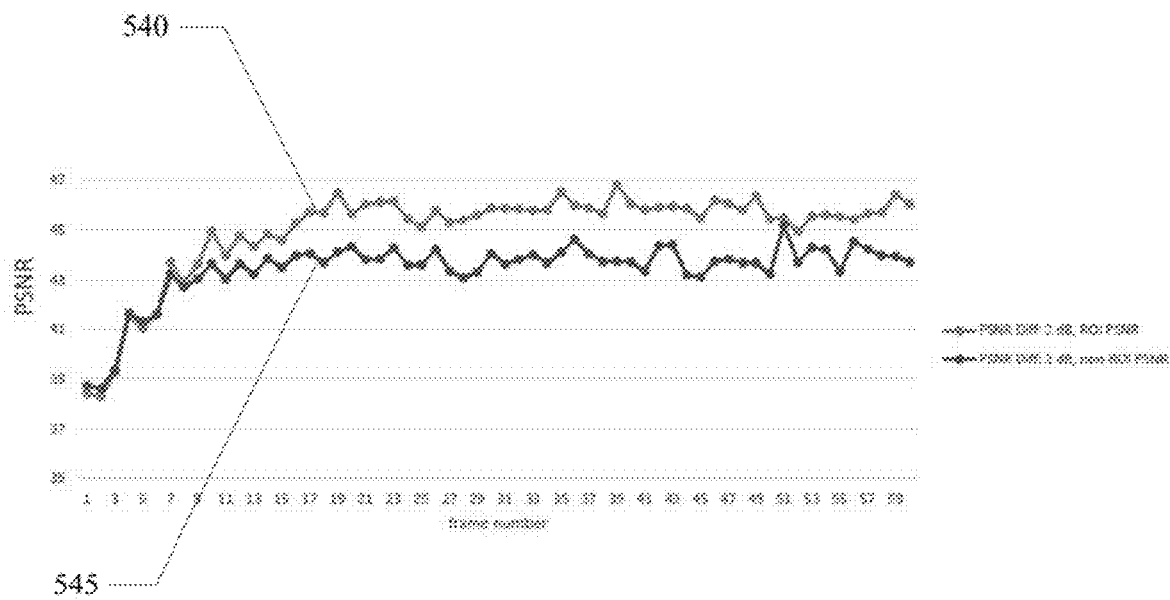

Referring now to FIGS. 5A-5C, exemplary peak-signal-to-noise ratios (PSNR) for encoded frames, in accordance with aspects of the present technology, are shown. The peak-signal-to-noise ratios for a plurality of frames of 720 video encoded at 1.5 megabits-per-second (Mbps) for peaksignal-to-noise ratios (PSNR) of 0 dB, 1 dB and 2 dB between regions of interest and non-regions of interest are illustrated in FIG. 5A. The lower plot 505 illustrates a 0 dB PSNR difference between regions of interest and non-regions of interest. The middle plot 510 illustrates a 1 dB PSNR difference between regions of interest and non-regions of interest. The upper plot 515 illustrates a 2 dB PSNR difference between regions of interest and non-regions of interest. As illustrated in FIG. 5B, the peak-signal-to-noise ratios (PSNR) for encoded frames with a 0 dB difference between the regions of interest 520 and non-regions of interest 525. The peak-signal-to-noise ratios (PSNR) for encoded frames with a 1 dB difference between the regions of interest 530 and non-regions of interest 535 is illustrated in FIG. 5C. The peak-signal-to-noise ratios (PSNR) for encoded frames with a 2 dB difference between the regions of interest 530 and non-regions of interest 535 is illustrated in FIG. 5D.

Figure 6:
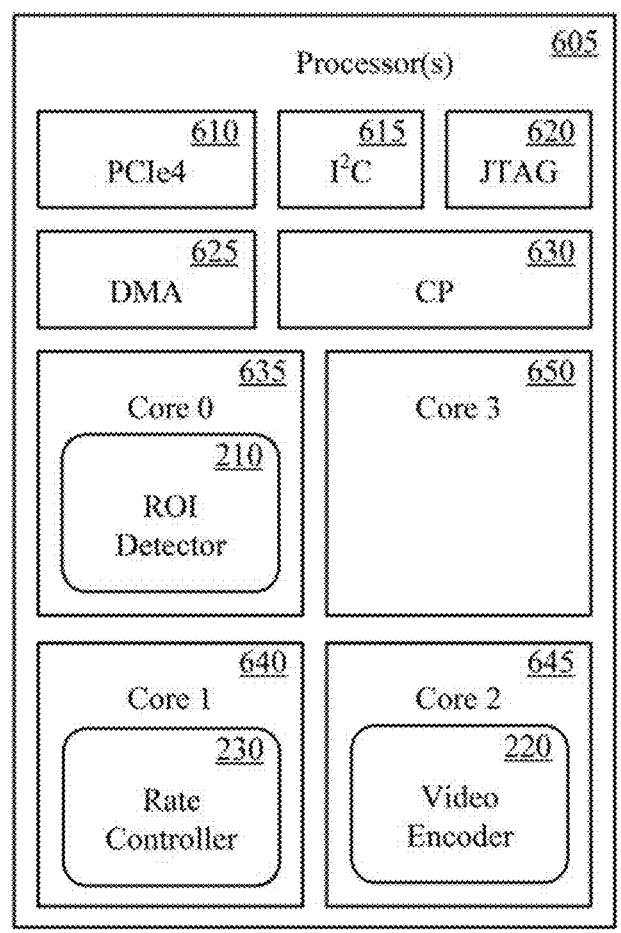
FIG. 6 shows a block diagram of an exemplary processing unit including a video processing unit, in accordance with aspects of the present technology.

Referring now to FIG. 6 an exemplary processing unit including a video processing unit, in accordance with aspects of the present technology, is shown. The processing unit 605 can include one or more communication interfaces, such as peripheral component interface (PCIe4) 610 and inter-integrated circuit ($I^2C$) interface 615, an on-chip circuit tester, such as a joint test action group (JTAG) engine 620, a direct memory access engine 625, a command processor (CP) 630, and one or more cores 635-650. The one or more cores 635-650 can be coupled in a direction ring bus configuration. The one or more cores 635-650 can execute one or more sets of computing device executable instructions to perform one or more functions including, but not limited to, region of interest detection, rate control and video encoding as described above. The one or more functions can be performed on individual core 635-650, can be distributed across a plurality of cores 635-650, can be performed along with one or more other functions on one or more cores, and or the like.

The processor unit 605 can be a central processing unit (CPU), a graphics processing unit (GPU), a neural processing unit (NPU), a vector processor, a memory processing unit, or the like, or combinations thereof. In one implementation, one or more processors 605 can be implemented in a computing devices such as, but not limited to, a cloud computing platform, an edge computing device, a server, a workstation, a personal computer (PCs), or the like.

Figure 7:
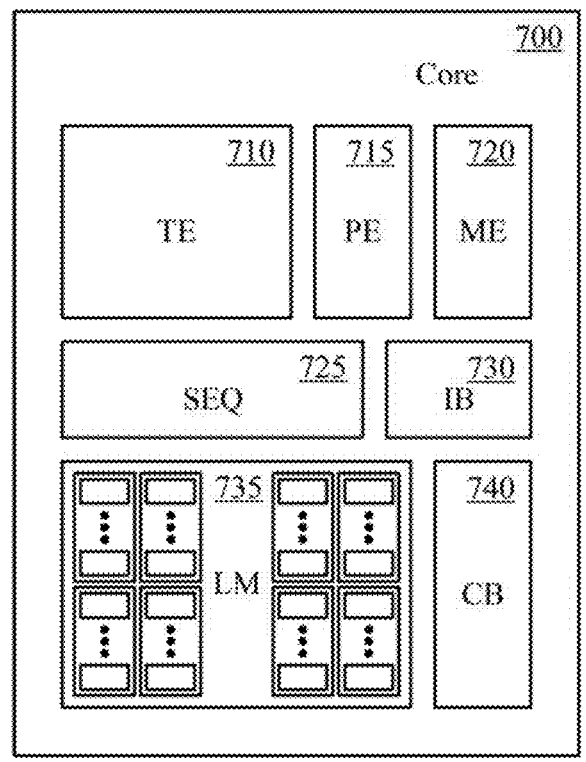
FIG. 7 shows a block diagram of an exemplary processing core, in accordance with aspects of the present technology.

Referring now to FIG. 7, a block diagram of an exemplary processing core, in accordance with aspects of the present technology, is shown. The processing core 700 can include a tensor engine (TE) 710, a pooling engine (PE) 715, a memory copy engine (ME) 720, a sequencer (SEQ) 725, an instructions buffer (IB) 730, a local memory (LM) 735, and a constant buffer (CB) 740. The local memory 735 can be pre-installed with model weights and can store in-use activations on-the-fly. The constant buffer 740 can store constant for batch normalization, quantization and the like. The tensor engine 710 can be utilized to accelerate fused convolution and or matrix multiplication. The pooling engine 715 can support pooling, interpolation, region-of-interest and the like operations. The memory copy engine 720 can be configured for inter- and or intra-core data copy, matrix transposition and the like. The tensor engine 710, pooling engine 715 and memory copy engine 720 can run in parallel. The sequencer 725 can orchestrate the operation of the tensor engine 710, the pooling engine 715, the memory copy engine 720, the local memory 735, and the constant buffer 740 according to instructions from the instruction buffer 730. The processing unit core 700 can provide video coding efficient computation under the control of operation fused coarse-grained instructions for functions such as region of interest detection, bit rate control, variable bit rate video encoding and or the like. A detailed description of the exemplary processing unit core 700 is not necessary to an understanding of aspects of the present technology, and therefore will not be described further herein.

Aspects of the present technology can advantageously improve bit allocation for variable rate video encoding and or improve determination of quantization parameters. Aspects can be utilized to enhance quality of regions of interest by allocating more bits to encoding regions of interest when there is a target bit budget for the video frame. Aspects can save bits by degrading the quality of the non-regions of interest when maintaining a predetermined quality for regions of interest. Aspects can achieve target qualities for regions of interest and non-regions of interest when allocating precise bits for regions of interest and non-regions of interest. Aspects can also resize the regions of interest to achieve a given quality, bit budget or the like. The feedback from the rate controller to the region of interest detector, and or the feedback from the video encoder to the rate controller and or region of interest detector can advantageously optimize performance, reduce computational workload, reduce bandwidth utilization and or reduce energy consumption as a result of improved variable bit rate encoding control.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A video processing unit comprising:
a region of interest detector configured to receive an input video stream and determine one or more regions of interest of an image data frame of the input video stream, and to adjust the determined one or more regions of interests based on encoder feedback information and rate controller feedback information;
a video encoder configured to differentially encode the adjusted one or more regions of interest using a first bit rate and one or more non-regions of interest using a second bit rate based on adjusted rate control parameters, to generate a compressed bit stream of the image data frame, and to generate the encoder feedback information; and
a rate controller configured to generate one or more rate control parameters, to generate the rate controller feedback information, and to adjust the one or more rate control parameters based on the encoder feedback information.

2. The video processing unit of claim 1, wherein the rate controller is further configured to adjust the one or more rate control parameters based on a. requested quality difference between the determined one or more regions of interest and the one or more non-regions of interest.

3. The video processing unit of claim 1, wherein the rate controller is further configured to adjust the one or more rate control parameters based on residual encoder bits received from the video encoder.

4. The video processing unit of claim 3, wherein the rate controller is further configured to adjust the one or more rate control parameters based on a difference between the image data frame and a reconstructed data frame based on the compressed bit stream.

5. The video processing unit of claim 3, wherein the encoder feedback information includes residual encoder bit information.

6. The video processing unit of claim 1, wherein the one or more rate control parameters include a region of interest quantization parameter and a non-region of interest quantization parameter.

7. The video processing unit of claim 6, wherein the rate controller is further configured to constrain the quantization parameters or rate-distortion-optimization parameters.

8. A video processing unit comprising:
a region of interest detector configured to determine one or more regions of interest in an image data frame, and to adjust the determined one or more regions of interest based on encoder feedback information and rate controller feedback information;
a rate controller communicatively coupled to the region of interest detector, the rate controller configured to generate region of interest quantization parameter and non-region of interest quantization parameter, to generate rate controller feedback information, and to adjust the region of interest quantization parameter and non-region of interest quantization parameter based on the encoder feedback information, the rate controller including:
a region of interest/non-region of interest bit allocation unit configured to generate a target bit allocation for one or more determined regions of interest and a target bit allocation for one or more non-regions of interest based on a frame level bit allocation, coordinates of the one or more determined regions of interest, a target complexity of the one or more regions of interest and the one or more non-regions of interest, and a target quality for the one or more regions of interest and non-region of interest;
a region of interest quantization model unit configured to generate a region of interest quantization parameter based on the region of interest target bit allocation; and
a non-region of interest quantization model unit configured to generate a non-region of nterest quantization parameter based on the non-region of interest target bit allocation; and
a video encoder communicatively coupled to the region of interest detector and the rate controller, the video encoder configured to generate a compressed bit stream of the image data frame based on the adjusted region of interest quantization parameter and the adjusted non-region of interest quantization parameter and to generate the encoder feedback information.

9. The video processing unit of claim 8, wherein the rate controller further includes:
a region of interest/non-region of interest quality estimation unit configured to determine a target quality based upon a requested quality and a difference between the image data frame and a reconstructed data frame; and
the region of interest/non-region of interest hit allocation unit further configured to generate the target bit allocation for the one or more determined regions of interest and the one or more non-region of interest based on the target quality.

10. The video processing unit of claim 9, wherein the requested quality comprises a difference in quality between the one or more regions of interest and the one or more non-regions of interest.

11. The video processing unit of claim 9, wherein the region of interest detector is configured to adjust one or more regions of interest in the image data frame based on frame target bit information and the target quality from the rate controller.

12. The video processing unit of claim 11, wherein he region of interest detector is configured to adjust one or more regions of interest in the image data frame further based on as encoded bit rate information from the video encoder.

13. The video processing unit of claim 8, wherein the rate controller further includes:
a region of interest/non-region of interest complexity estimation unit configured to estimate a target complexity based on residual encoder bit information from the video encoder; and
the region of interest/non-region of interest bit allocation unit further configured to allocate bits for the one or more determined regions of interest and allocate bits for the one or more non-region of interest based the residual bit information.

14. The video processing unit of claim 8, wherein the rate controller further includes a region of interest/non-region of interest quantization limitation unit configured to constrain a rate of change of the region of interest quantization parameter and the non-region of interest quantization parameter.

15. The video processing unit of claim 8, wherein:
a region of interest quantization model unit configured to generate a region of interest quantization parameter based on the region of interest target bit allocation and a rate-lambda-quantization model; and
a non-region of interest quantization model unit configured to generate a non-region of interest quantization parameter based on the non-region of interest target bit allocation and the rate-lambda-quantization model.

16. A method of video processing comprising:
receiving by a region of interest detector, a current video data frame;
determining, by the region of interest detector, one or more regions of interest for the current video data frame;
determining, by a rate controller, rate control information including one or more quantization parameters or one or more rate-of-distortion parameters for the one or more determined regions of interest and one or more non-regions of interest of the current video data frame for the current video data frame;
adjusting, b the region of interest detector, the one or more determined regions of interest for the current video data frame based on encoding information for a previous video data frame and rate control information for a previous video data frame;
adjusting, by the rate controller the rate control information for the current video data frame based on encoder information for the previous video data frame;
encoding, by a video encoder, the current video data frame in a compressed bit stream based on encoding information including the one or more adjusted regions of interest for the current video data frame, and the adjusted rate control information for the current video data. frame; and outputting, by the video encoder, the current compressed bit stream.

17. The method according to claim 16, further comprising determining, by the rate controller, the one or more quantization parameters or one or more rate-of-distortion parameters based on information including one or more of coordinates of the one or more regions of interest, a target complexity, residual encoder bit data, a requested quality, a difference between the current vide data frame and a reconstructed video data frame, a target quality, and a requested bit rate.

18. The method according to claim 16, further comprising constraining, by the rate controller, a rate of change of the one or more determined quantization parameters or rate-of-distortion parameters.

\* \* \* \* \*